Figure 1:
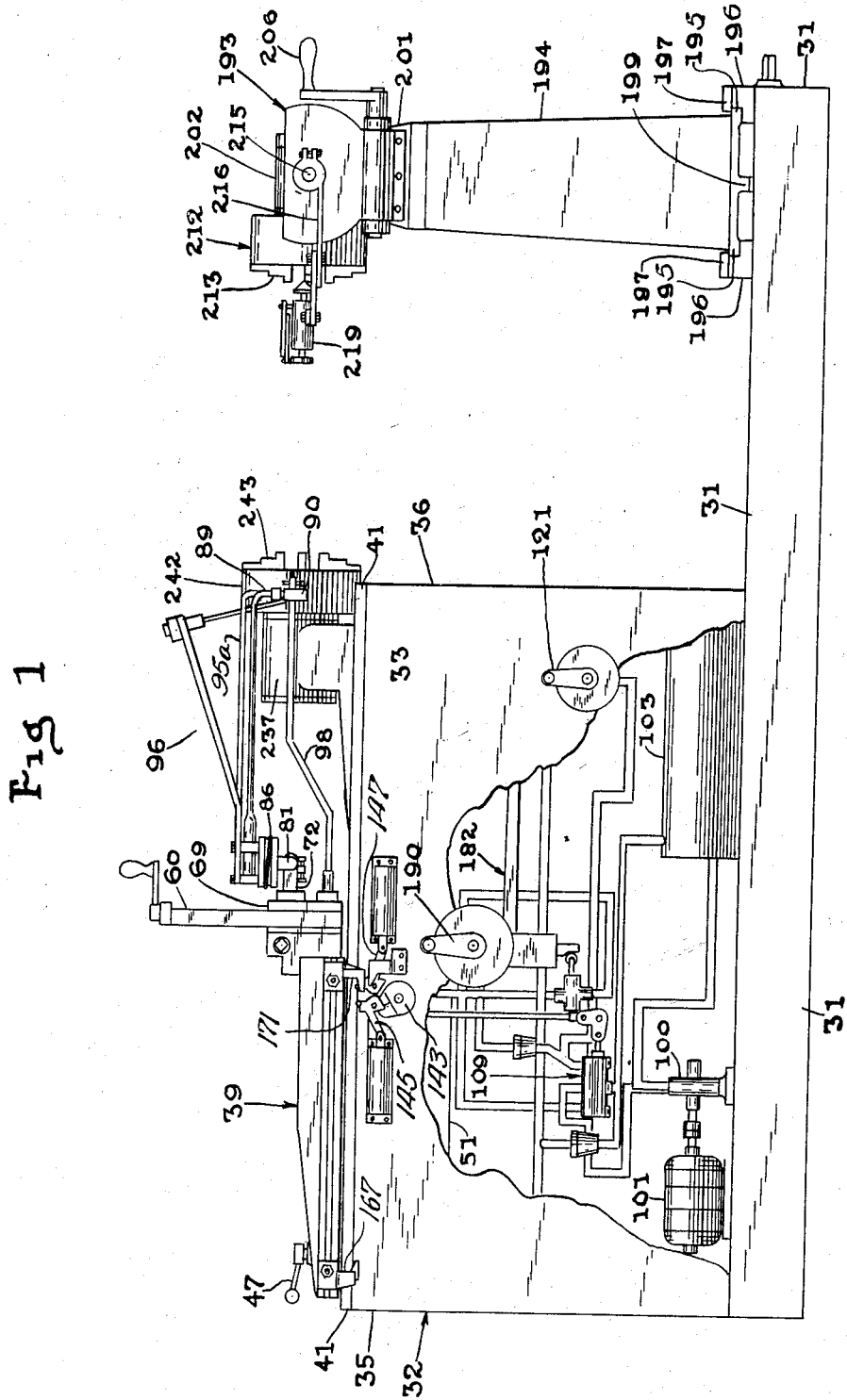

Feb. 6, 1940. C. W. DERHAMMER 2,189,460
APPARATUS FOR HARDENING GEARS, GEAR TEETH, AND OTHER ARTICLES
Filed July 22, 1937 13 Sheets-Sheet 2

Claude W. Derhammer
INVENTOR
BY
ATTORNEYS

Feb. 6, 1940.   C. W. DERHAMMER   2,189,460
APPARATUS FOR HARDENING GEARS, GEAR TEETH, AND OTHER ARTICLES
Filed July 22, 1937   13 Sheets-Sheet 3

Claude W. Derhammer
INVENTOR
BY Freeman, Swett, Albrecht, Wiedman
ATTORNEYS

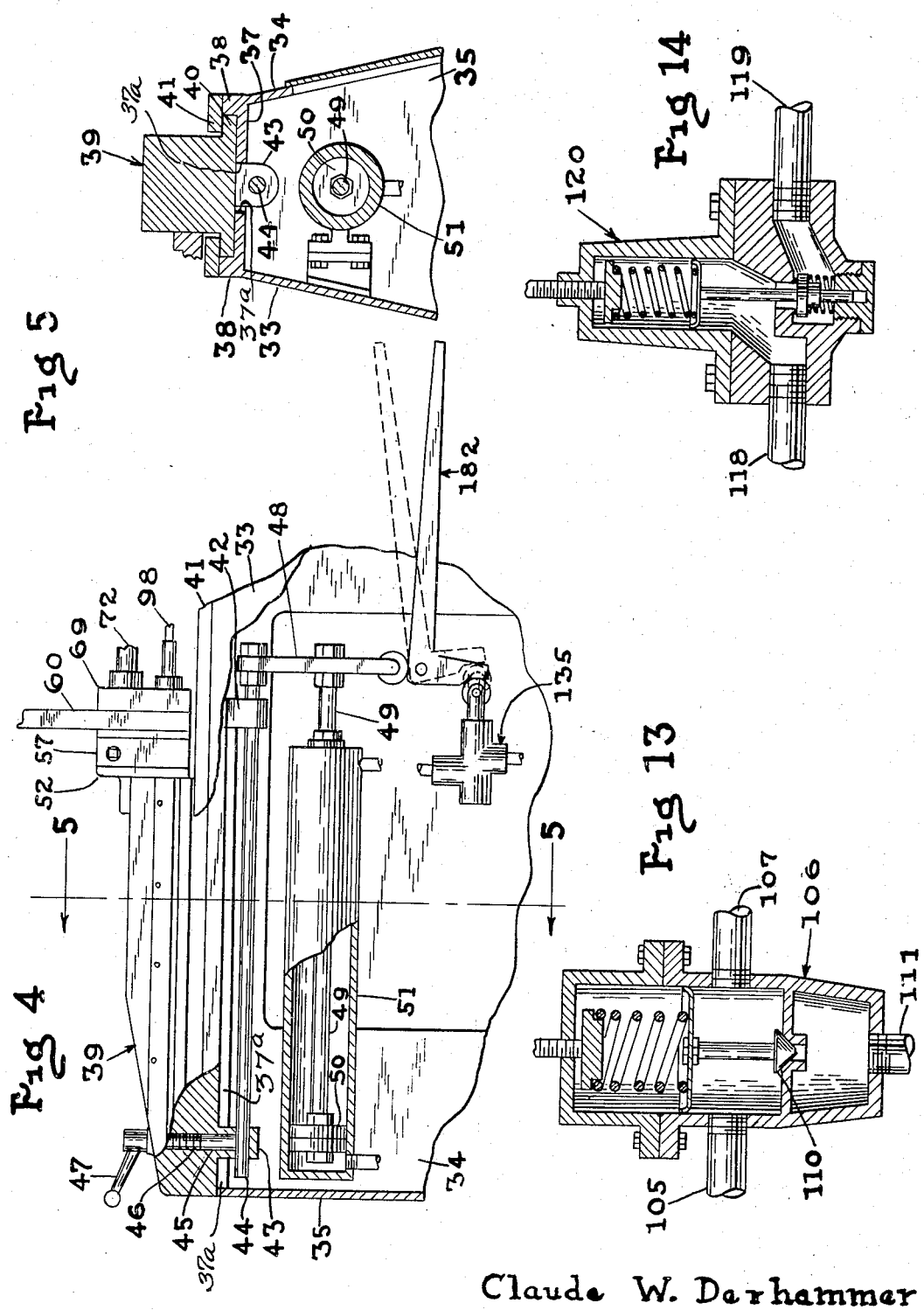

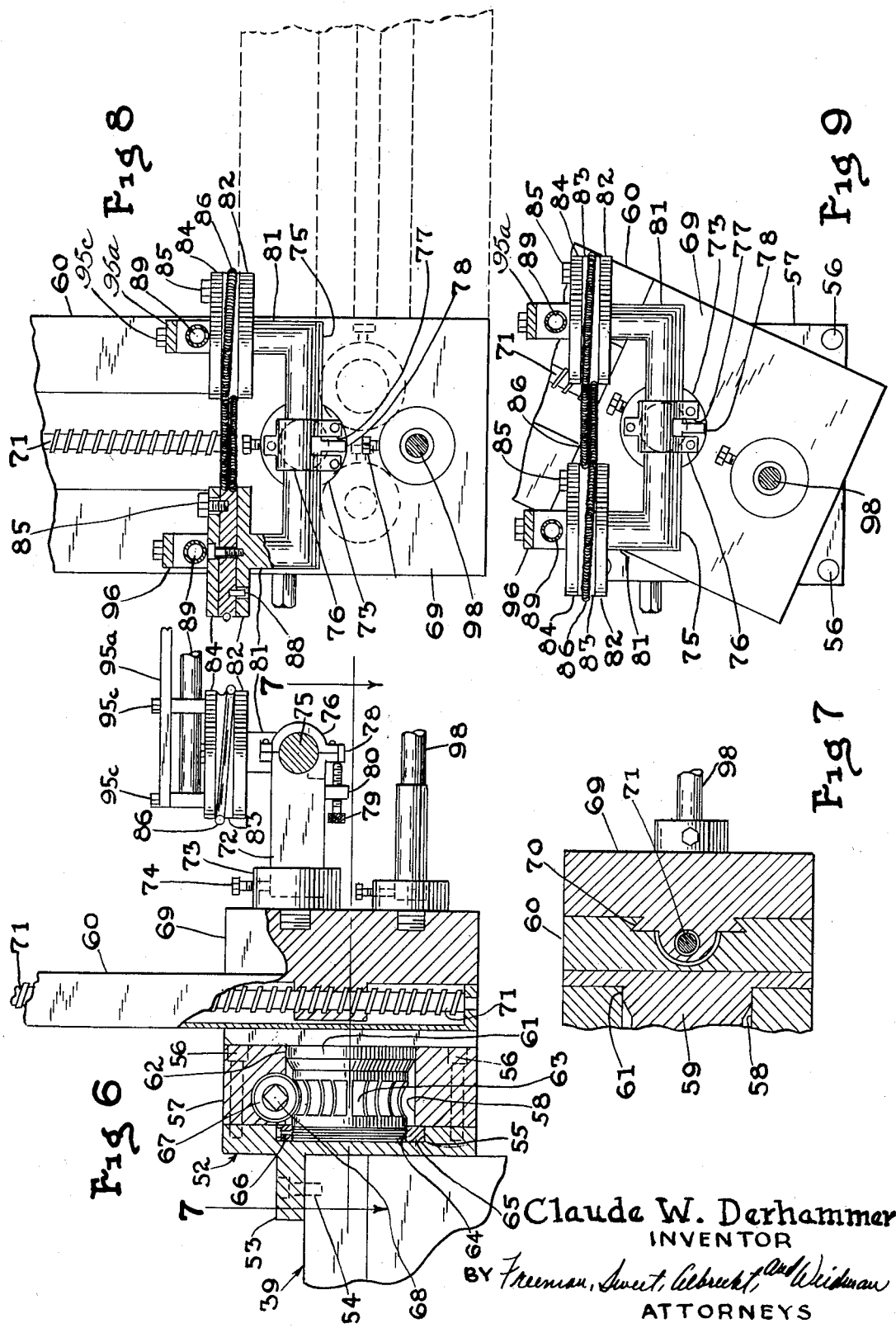

Feb. 6, 1940.   C. W. DERHAMMER   2,189,460
APPARATUS FOR HARDENING GEARS, GEAR TEETH, AND OTHER ARTICLES
Filed July 22, 1937   13 Sheets-Sheet 6
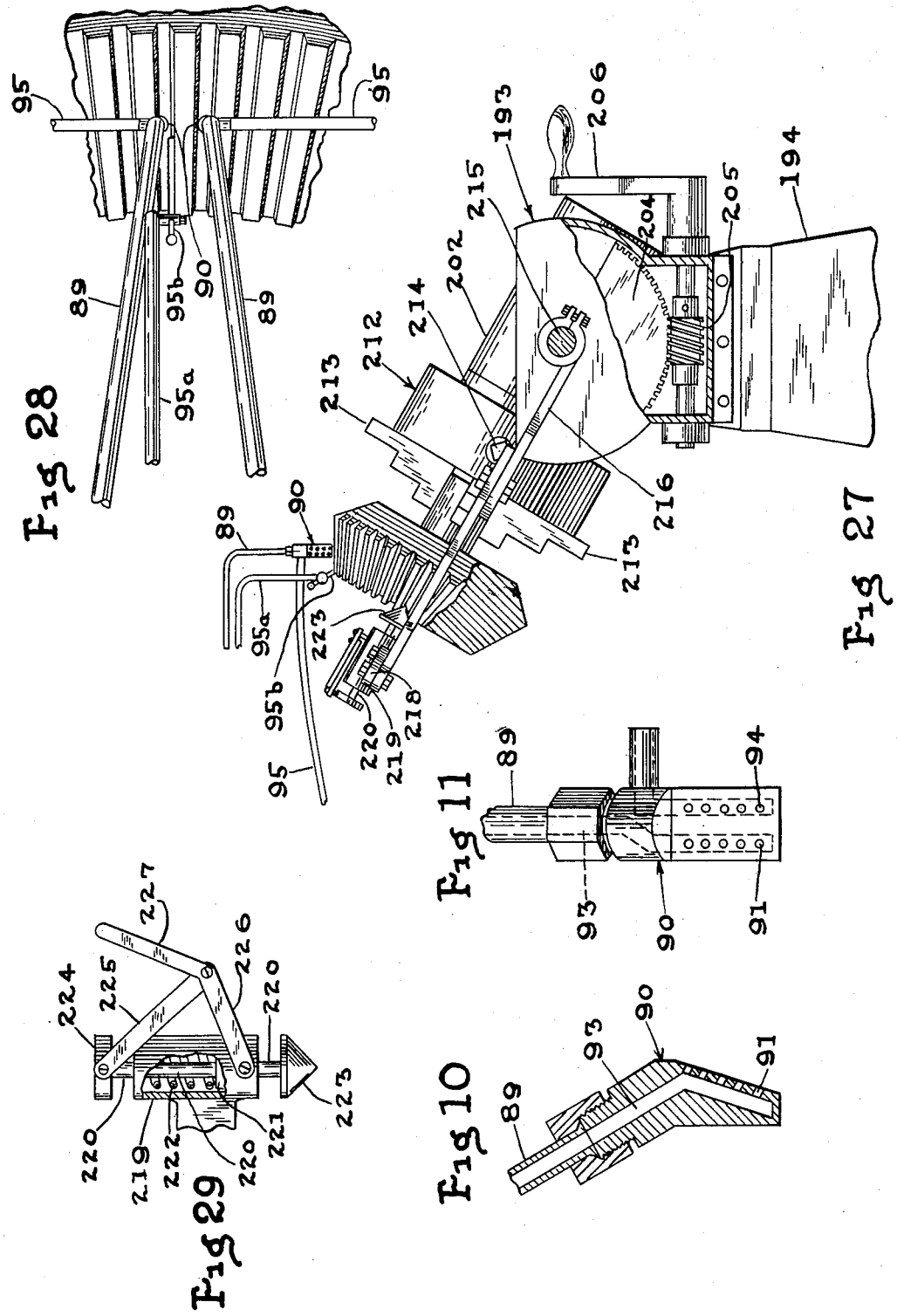
Claude W. Derhammer
INVENTOR
BY Freeman, Snow, Albrecht, and Wiedman
ATTORNEYS

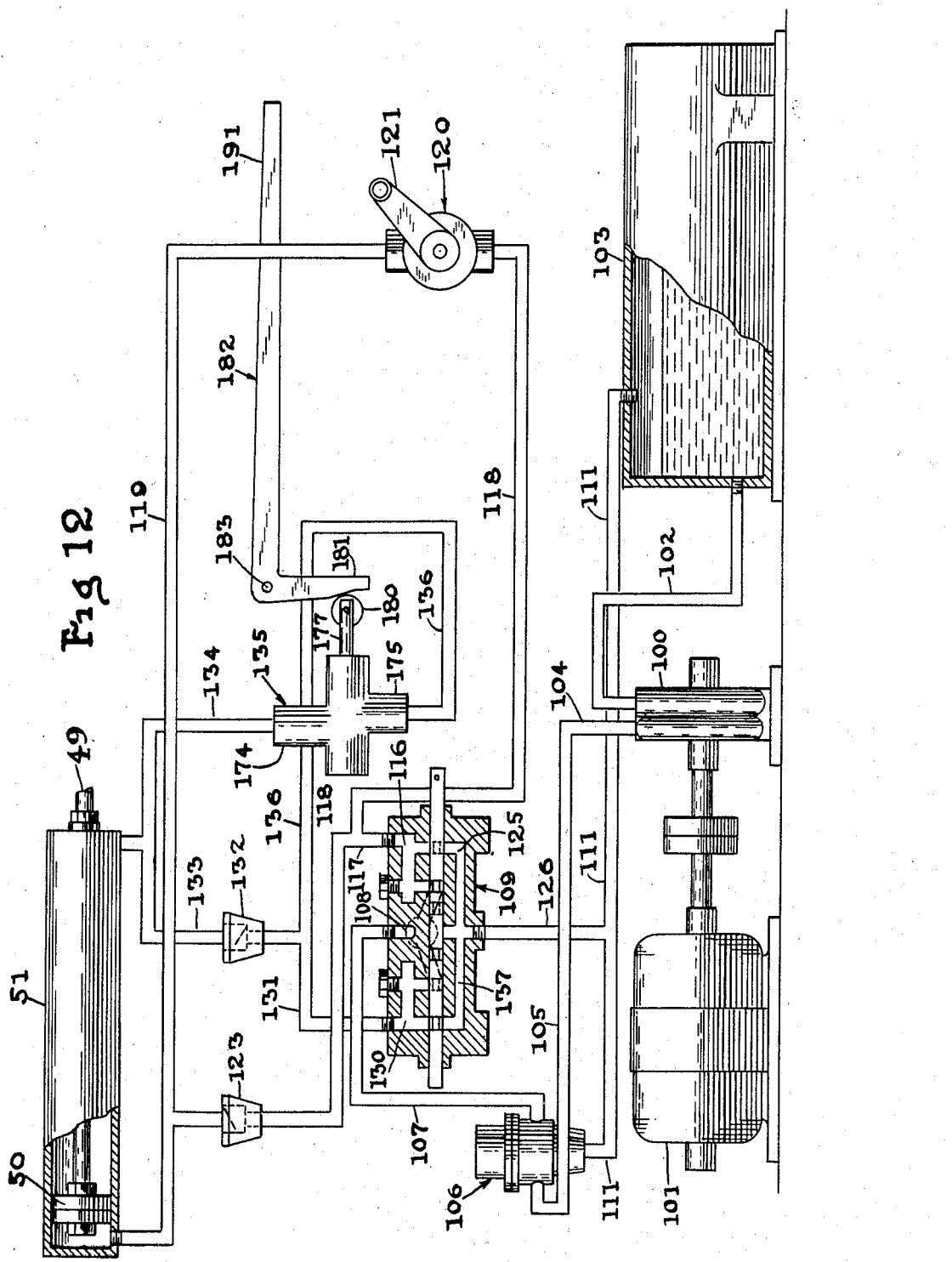

Feb. 6, 1940.   C. W. DERHAMMER   2,189,460
APPARATUS FOR HARDENING GEARS, GEAR TEETH, AND OTHER ARTICLES
Filed July 22, 1937   13 Sheets-Sheet 8
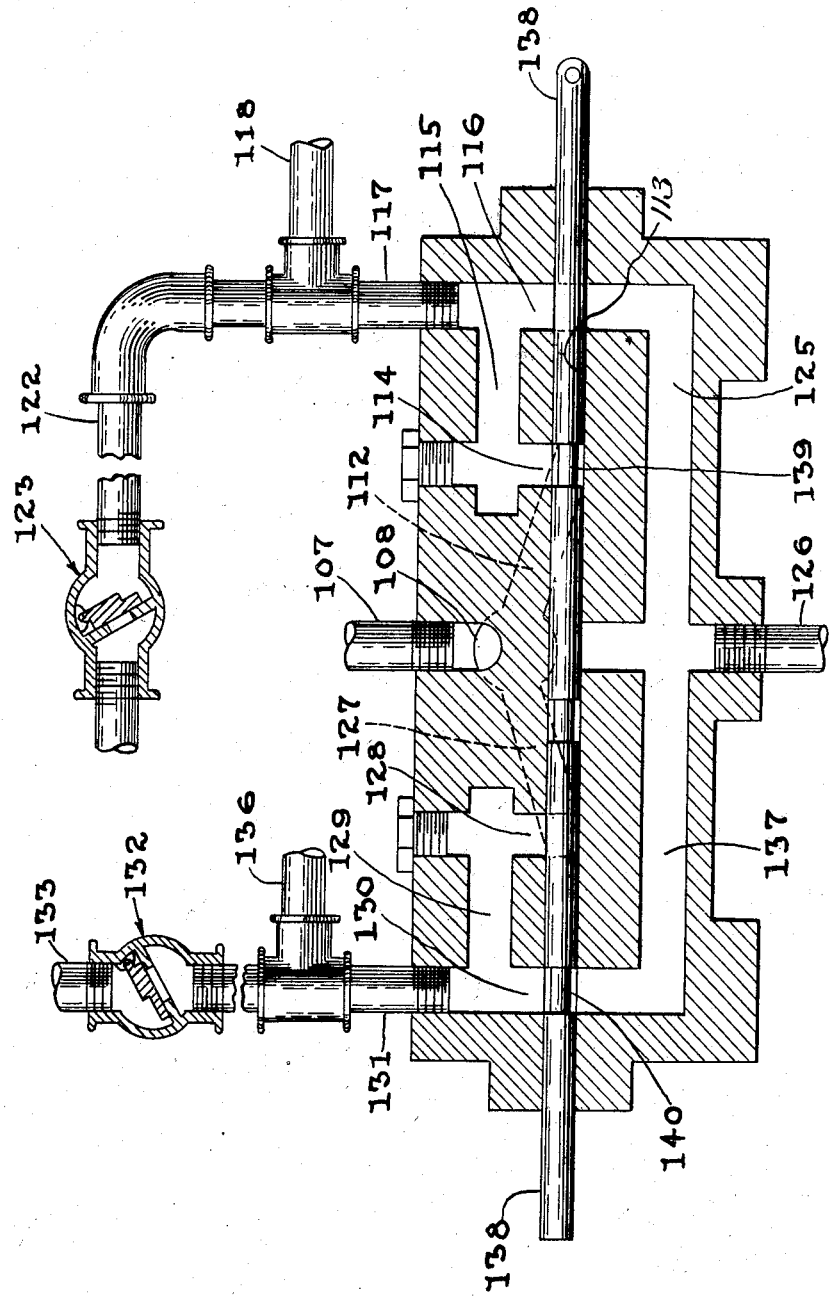
Claude W. Derhammer
INVENTOR
BY Freeman, Sweet, Albrecht, and Weidman
ATTORNEYS

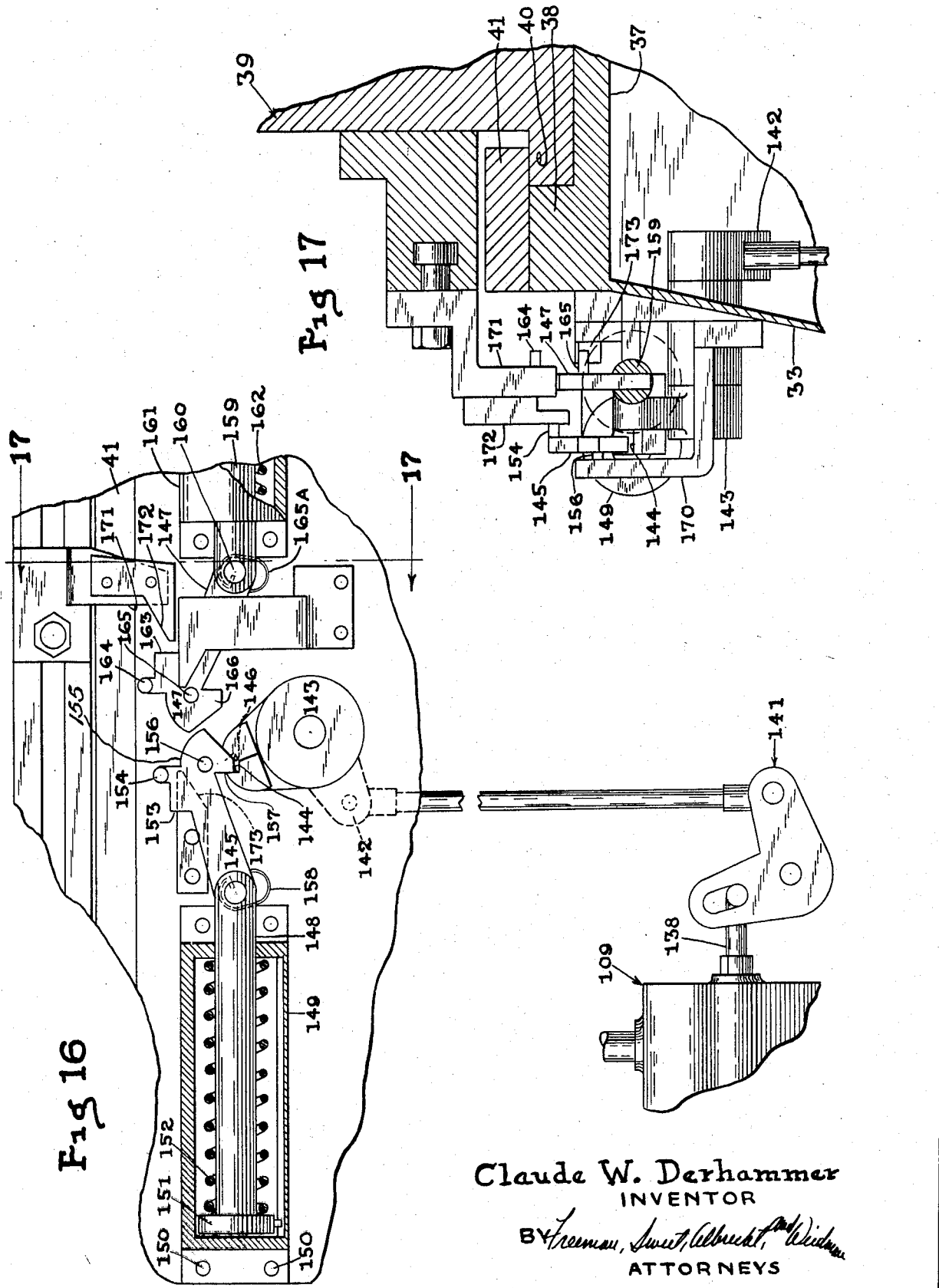

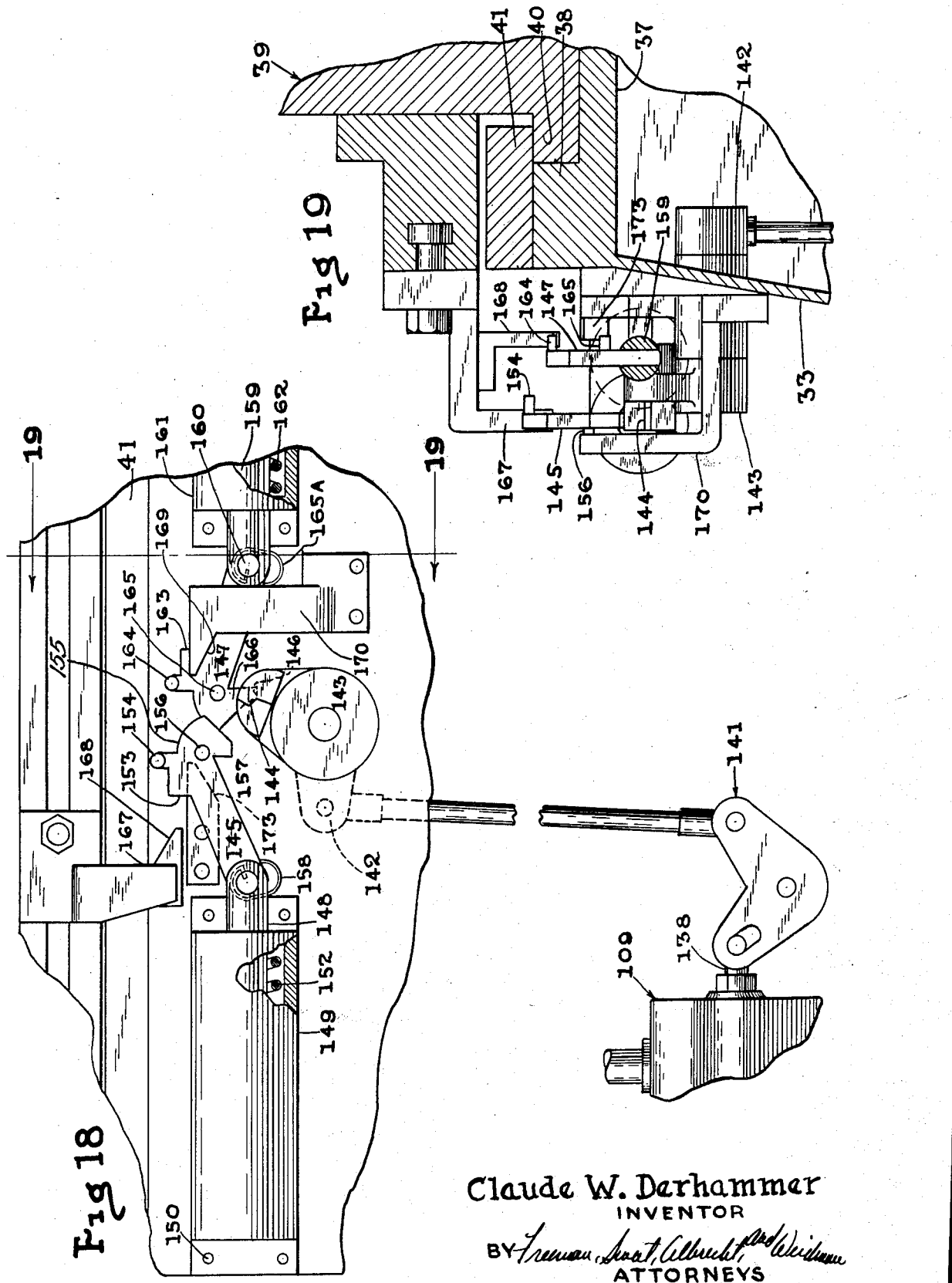

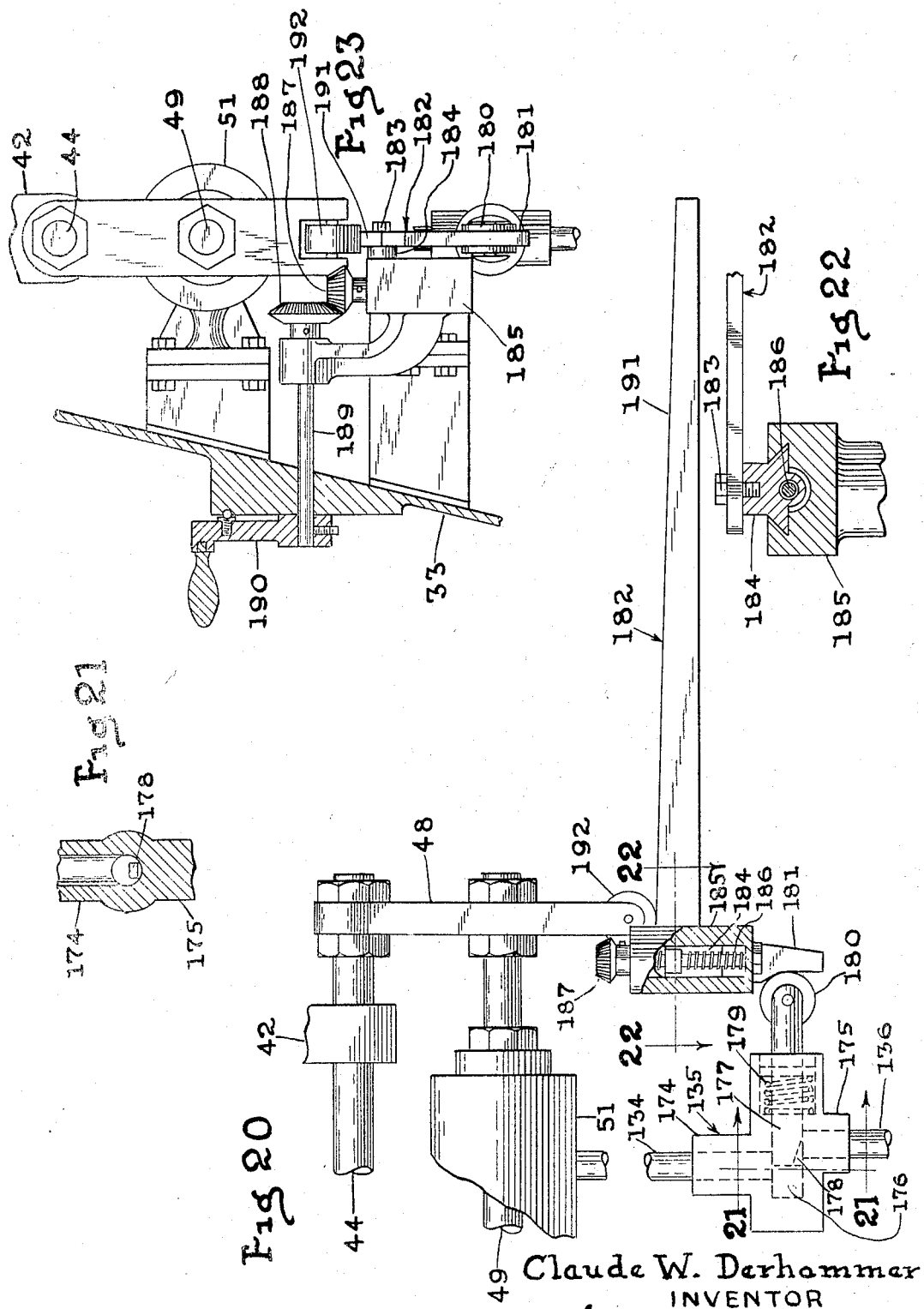

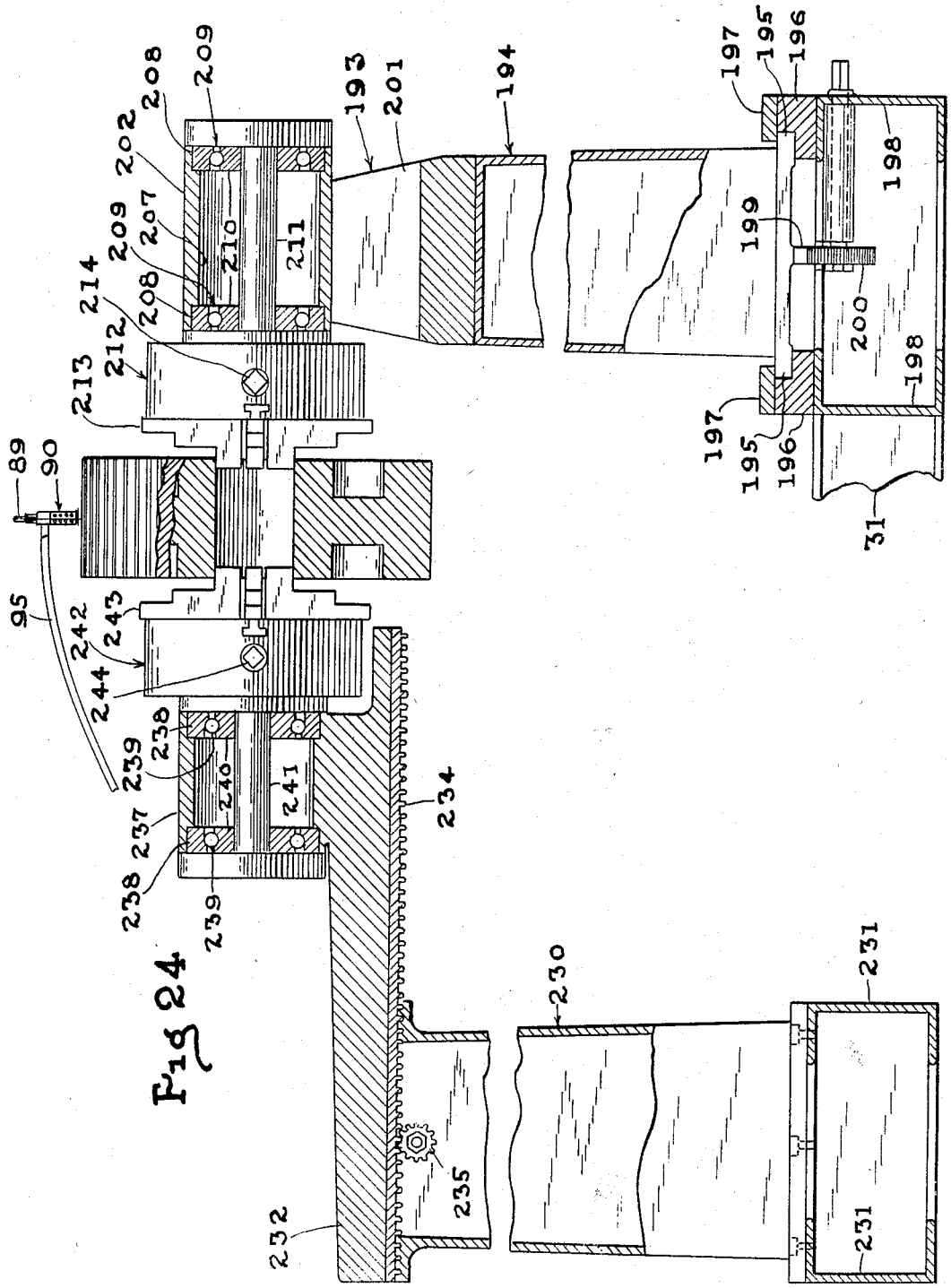

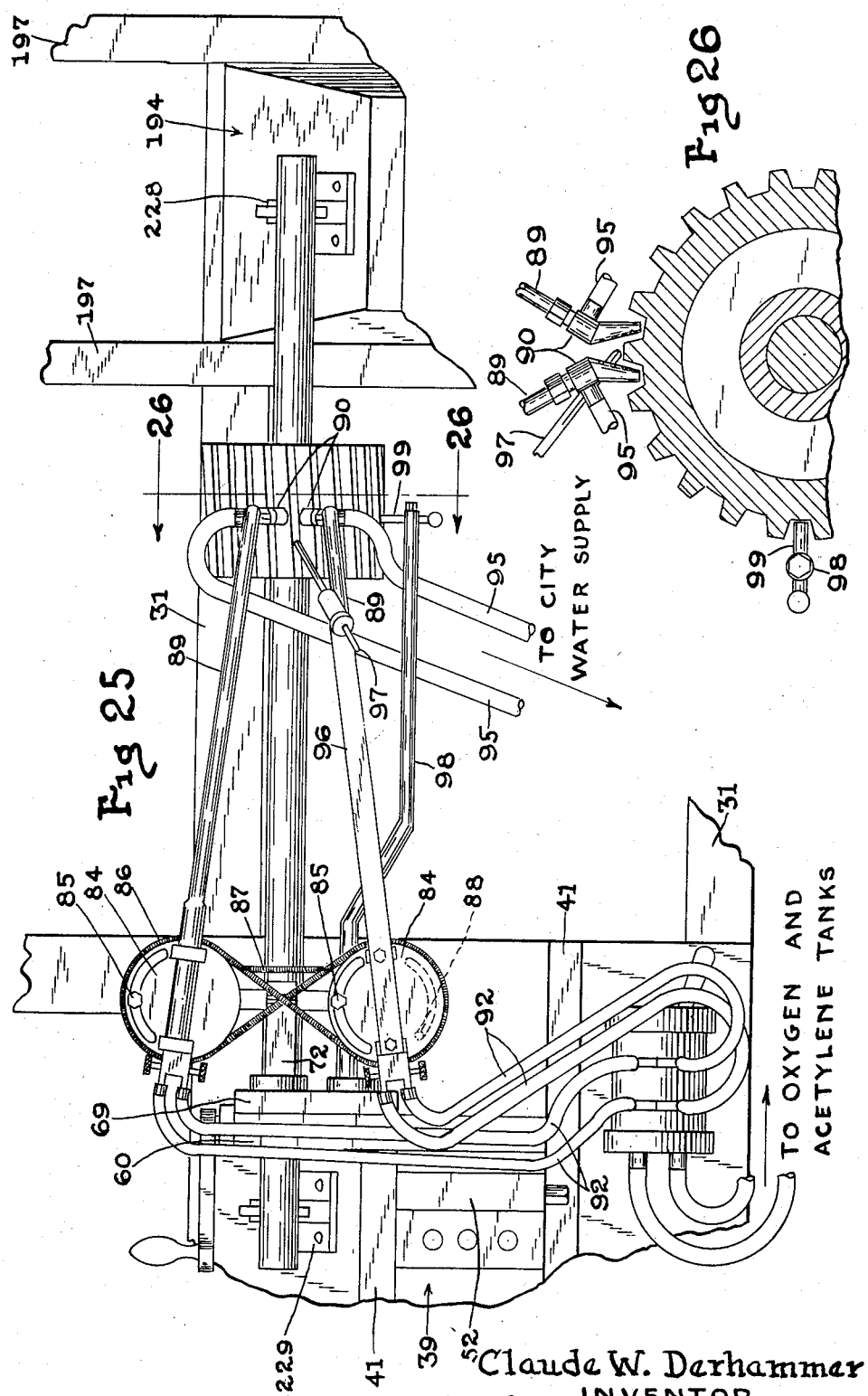

Patented Feb. 6, 1940

2,189,460

UNITED STATES PATENT OFFICE 2,189,460

APPARATUS FOR HARDENING GEARS, GEAR TEETH, AND OTHER ARTICLES

Claude W. Derhammer, East Cleveland, Ohio, assignor to The Lakeside Steel Improvement Company, Cleveland, Ohio, a corporation of Ohio Application July 22, 1937, Serial No. 155,047

20 Claims. (Cl. 266—4)

This invention relates to an apparatus for hardening, more particularly surface hardening, gears, gear teeth, and other articles, and has for an object the provision of a new and improved process, and a new and improved apparatus, for this purpose.

Figure 2:
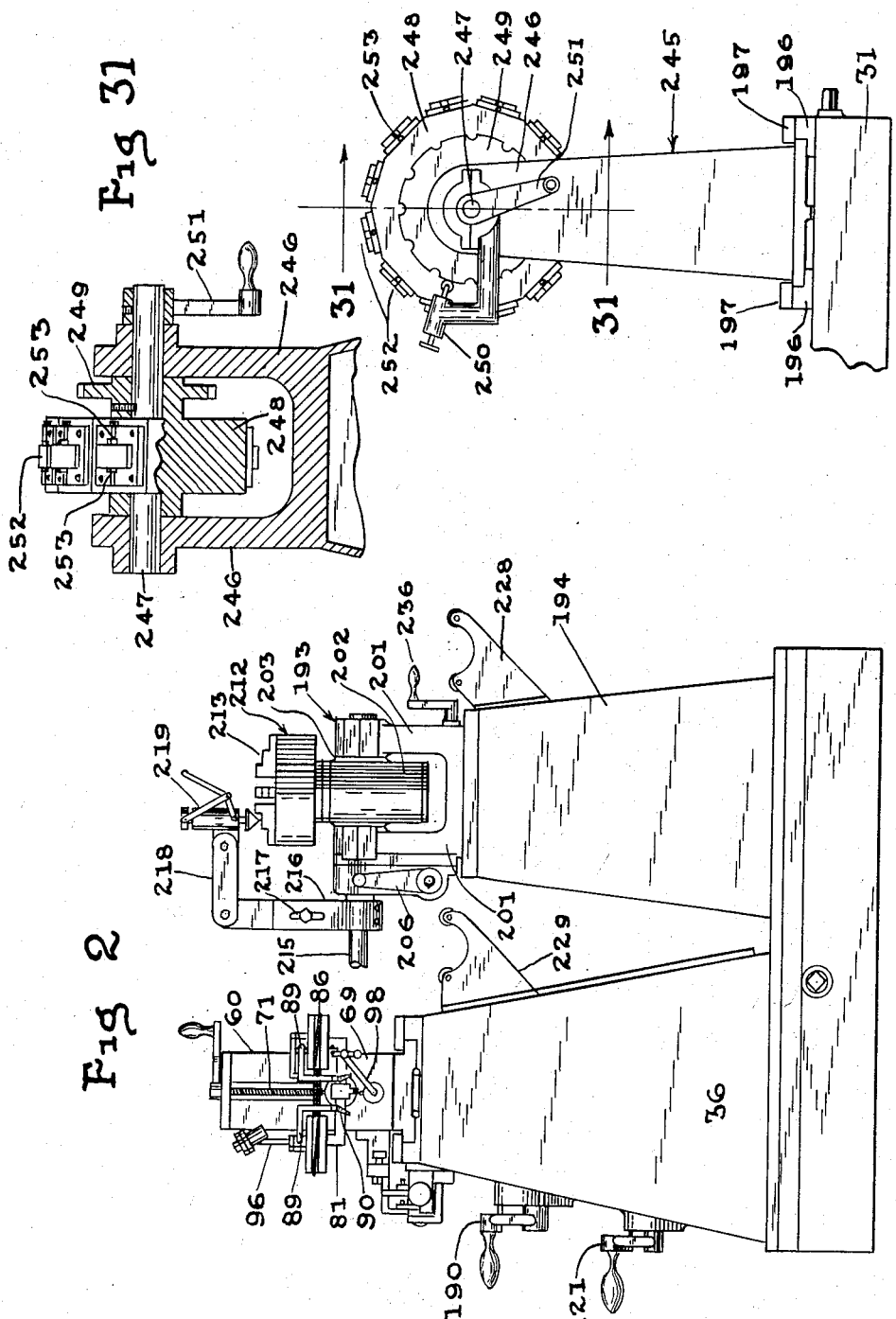
Figure 3:
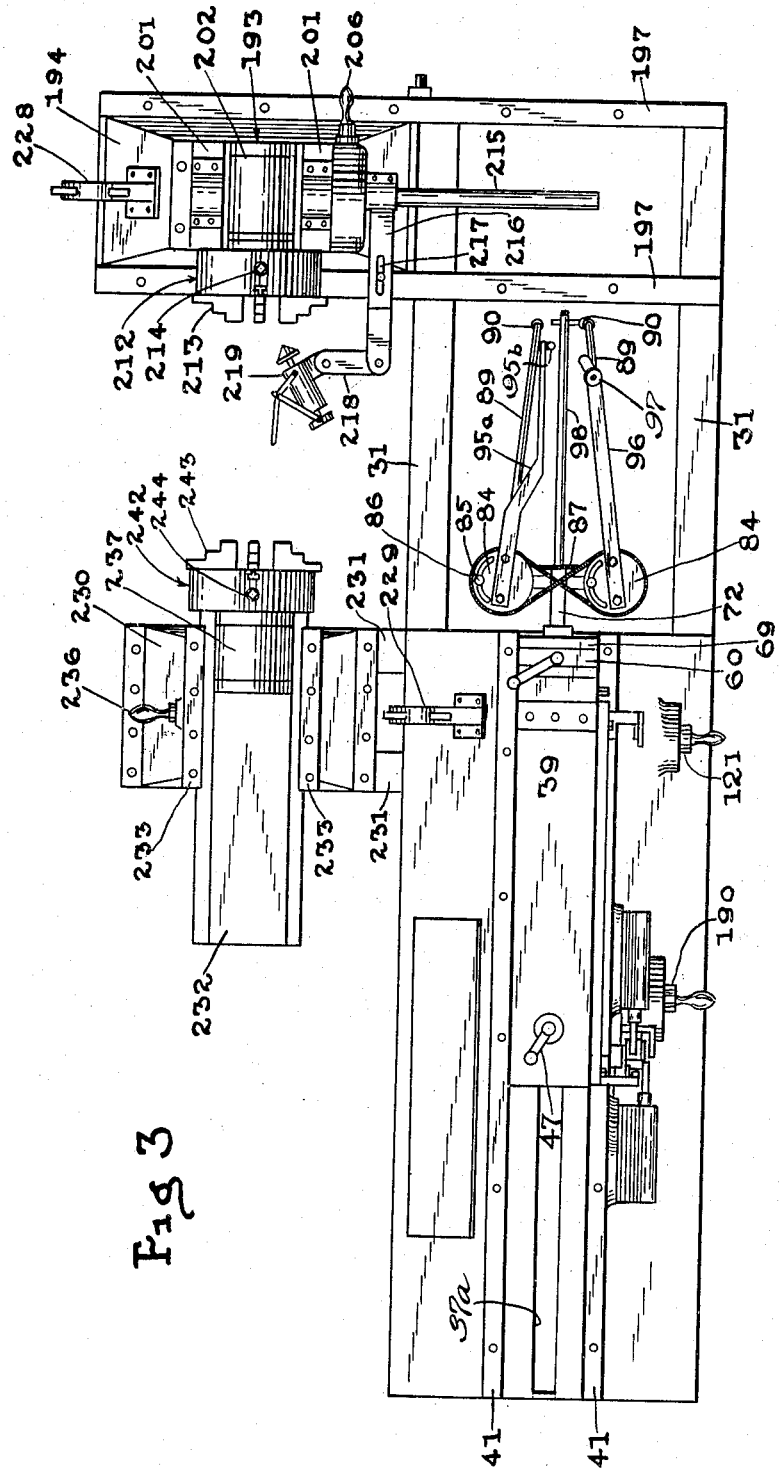

In the drawings accompanying this specification and forming a part of this application, I have shown, for purposes of illustration, embodiments which my invention may assume, and in the drawings:

Figure 1 is a side elevational view of an embodiment of the invention,

Figure 2 is an end elevational view of the apparatus, illustrating one of the work supporting pedestals shifted to one of its adjusted positions, Figure 3 is a top plan view of the apparatus, showing the work supporting pedestals longitudinally in line, Figure 4 is an enlarged fragmentary view, partly in vertical section, and partly in elevation, disclosing the torch carriage mechanism, and actuating mechanism therefor, Figure 5 is a fragmentary, transverse, vertical sectional view, corresponding substantially to the line 5—5 of Figure 4, Figure 6 is an enlarged, fragmentary, vertical sectional view of the adjustable torch carrying head, Figure 7 is a fragmentary horizontal sectional view, corresponding substantially to the line 7—7 of Figure 6, Figure 8 is a fragmentary, part sectional, part end elevational view, of the structure shown in Figure 6, disclosing an adjusted position thereof in dotted lines, Figure 9 is a view similar to Figure 8, showing both the head, and the burner brackets, in adjusted positions, Figure 10 is an enlarged, fragmentary, vertical sectional view through one of the torch nozzles, Figure 11 is a fragmentary, side elevational view of the torch nozzle shown in Figure 10, Figure 12 is a diagrammatic layout of the hydraulic means employed for actuating the torch carriage, Figure 13 is an enlarged, vertical sectional view, of a pressure reducing valve employed in connection with the invention, Figure 14 is an enlarged, vertical sectional view, of a pressure regulating valve mechanism, employed in connection with the invention, Figure 15 is an enlarged view of the control valve mechanism shown in Figure 12, parts of the associated structure being broken away, Figure 16 is an enlarged, fragmentary, part sectional, part elevational view, of reversing means employed in connection with the actuating mechanism, showing the same in one position, Figure 17 is a fragmentary, part vertical sectional, part elevational view, corresponding substantially to the line 17—17 of Figure 16, Figure 18 is a view similar to Figure 16, showing the mechanism in a different position, Figure 19 is a fragmentary, vertical sectional view, partly in elevation, corresponding substantially to the line 19—19 of Figure 18, Figure 20 is an enlarged, fragmentary, part vertical sectional, part elevational view, disclosing mechanism for controlling speed of movement of the torch carriage, Figure 21 is a transverse sectional view through the speed control mechanism, corresponding substantially to the line 21—21 of Figure 20, Figure 22 is an enlarged fragmentary, horizontal sectional view corresponding substantially to the line 22—22 of Figure 20, Figure 23 is an enlarged, fragmentary, part sectional, part elevational view, showing operating mechanism for adjusting the speed control mechanism, Figure 24 is an enlarged, part elevational, part vertical sectional view through the work holders, and showing a gear in position to be treated, Figure 25 is a part sectional, part elevational view, of the work holding means when employed in connection with a helical gear, Figure 26 is an enlarged, detailed, fragmentary, part sectional, part elevational view of indexing means employed in connection with the invention, the view being taken on a line corresponding substantially to the line 26—26 of Figure 25, Figure 27 is a part sectional, part elevational view, showing work holding means when supporting a beveled gear for treatment, Figure 28 is an enlarged, fragmentary, top plan view of a portion of the structure shown in Figure 27, Figure 29 is an enlarged, part sectional, part elevational view, of a holding device employed in connection with the invention, Figure 30 is a side elevational view of a different embodiment of a work holding means, while Figure 31 is an enlarged, fragmentary, vertical sectional view of the work holding means shown in Figure 30 and corresponding substantially to the line 31—31 of Figure 30.

As shown in the drawings the apparatus comprises an elongated platform 31, upon which is mounted an elongated housing 32, having side walls 33 and 34, end walls 35 and 36, and a top wall 37. As best shown in Figures 4 and 5, the top wall 37 is provided with longitudinally extending spaced ribs 38, between which is accommodated a reciprocating carriage 39, provided with laterally extending flanges 40, over which lie plates 41, secured to the ribs 38, the top wall 37 being centrally slotted longitudinally, as shown at 37a, for the reception of spaced ears 42 and 43 projecting therethrough, these ears accommodating a rod 44, adjustably fixed in position by a set screw 45, tapped vertically through the carriage 39, as at 46, and manipulable for adjustment by a handle 47. The rod 44, at its forward portion, is connected by a yoke 48 (Figures 4 and 20) with a rod 49 of a piston 50, reciprocably mounted in a cylinder 51, carried by a wall of the housing 32 (Figure 5), reciprocation of the piston 50 being hydraulically effected and controlled in a manner hereinafter more fully explained.

As best shown in Figures 4, 5, 6, 7, 8, and 9, the carriage 39 at its forward end carries a supporting block 52, having a flange 53 resting on the top portion of the carriage 39, and secured in position by bolts 54. The block 52 in its forward face, is provided with an annular recess 55, and secured to the margins of the block 52 surrounding the recess 55, by bolts 56, is a bearing member 57. The bearing member 57 is provided with a bearing opening 58, through which extends a stud 59 connected in any suitable manner to an elongated supporting stand 60, the stud 59 having a shouldered portion 61 fitting the bearing opening 58 snugly, as at 62, having also a worm gear portion 63 rearwardly of the shoulder 61, and having a reduced threaded end portion 64 for the reception of a nut 65, which is accommodated in the annular recess 55 of the block 52, a pin 66 being provided to prevent rotation of the nut 65 relative to the stud 59. Rotatably mounted in the bearing member 57 is a worm 67, provided with a square head 68, by means of which the worm 67 may be rotated, the worm 67 being disposed to mesh with the worm gear 63, so that rotation of the worm 67, in one direction or the other will result in corresponding swinging movements of the supporting stand 60 about the axis of the stud 59. On the forward face of the supporting stand 60 there is mounted a slide 69, having beveled edges fitted beneath undercut grooves 70 in the face of the stand 60, and the slide 69 is adapted to be reciprocated with reference to the stand 60 by means of a jack screw 71 which is journalled at the upper and lower ends of the stand 60, and threaded through a lug formed integral with the slide 69, rotation of the screw 71 resulting in movements of the slide 69 longitudinally along the face of the stand 60.

Projecting horizontally outwardly from the face of the slide 69, is a supporting member 72, the inner end of which is rotatably accommodated in a boss 73, and adjustably held by a set screw 74, the outer end of the member 72 having a half-round bearing for the reception of a shaft 75, held in position by a bearing cap 76 secured to the member 72, and having a slot 77 through which extends a projection 78 on the shaft 75, a set screw 79 abutting against the projection 78 and threadedly carried by a suitable bearing 80 on the member 72. The shaft 75 forms part of a bearing bracket having upstanding portions 81 at each end, and each portion 81 has fixedly secured to its end a supporting disc 82. Rotatably mounted upon each supporting disc 82 is a second disc 83, and supported on top of the disc 83 is a carrying disc 84, the latter disc being adjustably fixed to the disc 83 by a set screw 85 working in a slot formed in the disc 84. Each disc 83 is provided in its circumferential periphery with a groove for the reception of a coiled spring 86, looped around the discs 83 in figure eight formation, whereby rotation of one disc 83 effects rotation of the other disc 83 in a reverse direction, the discs 83 being urged in a predetermined direction by a coiled spring 87 having its ends connected to oppositely moving portions of the spring 86, movement of said discs 83 in said predetermined direction being limited by a pin and slot arrangement 88, this construction cooperating to position torches, hereinafter described, in proper positions.

Mounted upon each carrying disc 84, by any suitable fastening means, is one end portion of a torch 89, the torches 89 projecting outwardly from the discs 84 in converging relation, and at its end each torch 89 carries a nozzle 90 (Figures 10 and 11) which has burner jet openings 91 for burning fuel, in this case oxy-acetylene gas, supplied at the secured end of each torch by flexible hoses 92, and conducted thence through the bore 93 of each nozzle to the burner jet openings 91. Each nozzle 90 is also provided with openings 94 through which jets of water or cooling fluid are directed, the nozzles 90 being supplied with such fluid through flexible hoses, as indicated at 95. The torches 89 are so constructed that upon the forward stroke of the carriage 39, the flame travels in advance of the jets of water or cooling fluid, as will be more fully hereinafter explained. In addition to its torch 89, one of the discs 84 carries an outwardly projecting arm 95a, the outer end of which carries an adjustable finger 95b adapted during some of the operations of the apparatus to contact a tooth of a gear, as in Figure 28. The arm 95a is detachably secured in position by screw bolts 95c. The other disc 84 carries an arm 96, at the outer end of which is mounted a pyrometer 97 which projects into proximity to the nozzles 90, for indicating the degree of heat developed in connection with the hardening operation. The slide 69 also detachably carries an arm 98, projecting outwardly to a point in proximity to the nozzles 90 and having a finger 99 adapted to engage the teeth of a gear as in Figures 25 and 26.

Mechanism is employed for imparting controlled reciprocation to the piston 50 in the cylinder 51, this reciprocation being transmitted to the carriage 39 through the rod 44 and ears 42 and 43. This mechanism comprises a pump 100 driven by a motor 101, the pump 100 having an intake 102 from a suitable reservoir 103, and having an outlet 104 which discharges through a pipe 105 through a pressure regulating valve mechanism 106, and through a pipe 107 to the inlet duct 108 of a control valve mechanism indicated generally at 109. The valve mechanism 106 (Figure 13), may be of any suitable well known construction, and includes an adjustable spring held valve 110, adapted to be unseated by excess pressure, and to by-pass fluid through the pipe 111 to the reservoir 103. The valve mechanism 109 (Figures 12 and 15), is provided with a duct 112, communicating with a chamber 113 extending centrally, longitudinally, entirely through the casing of the valve mechanism 109, and the chamber 113 communicates through a duct 114 with a duct 115, and with a duct 116, and the latter duct communicates with a pipe 117 having a branch 118, which at its end portion 119, discharges into the cylinder 51, in the rear of the piston 50. Interposed in the branch pipe 118 is an adjustable pressure regulating valve mechanism 120 (Figure 14), which may be of any suitable well known construction, having a crank 121 by means of which the valve may be manually manipulated to change the pressure as desired. The pipe 117 also has a branch 122, tapped into the branch 118, adjacent to the discharge end portion 119, a one-way valve 123 of suitable construction, and best shown in Figure 15, being interposed in the branch pipe 122 adjacent to the point where the branch 122 is tapped into the branch 118, the valve 123 permitting fluid to travel toward the control valve mechanism 109, but preventing travel of the fluid in the opposite direction. The duct 116 also communicates with the longitudinal chamber 113, and the chamber 113 communicates through a duct 125, with an exhaust pipe 126 tapped into the exhaust pipe 111 leading to the reservoir 103. The inlet duct 108 also communicates by a duct 127 with the longitudinal chamber 113, and the chamber 113 communicates through a duct 128 with a duct 129, and the latter with a duct 130, and the duct 130 with a pipe 131, through a one-way valve 132 (Figure 15) and a pipe 133, with the forward portion of the cylinder 51 at the front of the piston 50. A pipe 134 communicates at one end with the pipe 133, and with the forward portion of the cylinder 51, and at its opposite end communicates with a retarding valve mechanism, indicated as an entirety at 135. The retarding mechanism 135 discharges into the pipe 136, leading to communication with the duct 130, which communicates with the chamber 113, and the chamber 113 through a duct 137 communicates with the exhaust pipe 126. The ducts leading into the chamber 113 are controlled by a reciprocatory valve member 138 provided with spaced annular grooves 139 and 140, the groove 139 being adapted to establish communicating registration of the ducts 112, 114, or the ducts 116, 125, depending upon the position of the valve member 138, while the groove 140 is adapted to establish communicating registration with the ducts 127, 128 or 130, 137. When the duct 112, groove 139 and duct 114 are in communication, the duct 130, groove 140 and duct 137 also are in registering communication, while the ducts 116, 125 and the ducts 127, 128 are cut off from communication. When the ducts 127 and 128 and the ducts 116, 125 are in communication, the ducts 112, 114 and 130 and 137 are closed.

Reciprocation of the valve member 138 is controlled by movement of the carriage 39, the end of the member 138 being connected by a slotted connection with one end of a bell crank lever 141, the opposite end of the bell crank lever 141 being connected by a link with a crank 142 secured to an oscillatory member 143, the upper portion of the oscillatory member 143 at one side having a suitably shaped notch 144 for the reception of a control dog 145, and at the opposite side having a reversely disposed notch 146 for the reception of a control dog 147. The dog 145 is pivotally mounted upon a rod 148, reciprocably mounted in a cylinder 149, the latter being secured in fixed relation with respect to the side wall of the housing 32 by bolts 150. The rod 148 is provided with an enlarged head 151, and between the head 151 and the opposite end of the cylinder 149, and surrounding the rod 148, is a relatively strong coiled spring 152. The dog 145 is provided with an angular shoulder 153, and at a higher level with a laterally projecting pin 154. The head 155 of the dog 145 is also provided with a laterally projecting pin 156, while the nose 157 of the dog 145 is shaped to enter the notch 144 at one side of the oscillating member 143. The dog 145 is normally urged in a counterclockwise direction by a relatively light spring 158 which is overcome when the nose 157 of the dog 145 is urged toward engagement with the notch 144, the spring 158, however, serving to hold the dog slightly elevated, as shown in Figure 18, when the dog 145 is disengaged from the oscillatory member 143. The dog 147 is oppositely disposed with reference to the dog 145, and is laterally out of line with said dog, so as to be in line with the notch 146 at the opposite side of the oscillating member 143. The dog 147 is pivotally connected to a rod 159, as at 160, and the rod 159 is accommodated in a cylinder 161 similar to the cylinder 149, and the rod is normally retracted by a spring 162 similar to the spring 152. The dog 147 has a shoulder 163, an upper laterally projecting pin 164 and a lower laterally projecting pin 165 similar to the shoulder 153, pin 154, and pin 156 of the dog 145. A light spring 165a, similar to the spring 158, is employed to hold the dog 147 up when disengaged. The nose 166 of the dog 147 is shaped so that the same when engaged with the notch 146, will rock the oscillating member 143 in a reverse direction when the dog 145 has been disengaged.

Means are provided for controlling the positions of the dogs 145 and 147. Referring to Figure 18 the carriage 39 is provided with a longitudinally adjustable pick-up shoulder 167, arranged in line with the shoulder 153 of the dog 145, and upon movement of the carriage 39 to the right, as viewed in Figure 18, the shoulder 167 will engage the shoulder 153 and draw the dog 145 outwardly against the pressure exerted by the spring 152. The carriage 39 is also provided with a cam shoe 168 adapted to travel in advance of the shoulder 167 and to ride beneath the pin 164 of the dog 147 so as to lift the dog 147 out of engagement with the notch 146, the pin 156 of the dog 145 simultaneously engaging the cam surface 169 of a bracket 170 secured at one side of the dog 147 so as to force the nose of the dog 145 into the notch 144, the nose 166 of the dog 147, meanwhile having been retracted from the notch 146. The dog 145, under the influence of the spring 152 will rock the oscillating member 143 in a counterclockwise direction, and reverse the position of the control valve member 138, as shown in Figure 16. The carriage 39 is also provided with a longitudinally adjustable pick-up shoulder 171, and a cam shoe 172 for disengaging the dog 145 upon reverse travel of the carriage 39, and the dog 147 is cammed into engagement with the notch 146 through coaction of the pin 165 of the dog 147 with the cam surface 173, and the dog 145 having been disengaged, and the dog 147 re-engaged, the oscillating member 143 will be returned to the position shown in Figure 18. Thus the travel of the carriage 39 is utilized to control the position of the valve member 138, and thereby to effect reciprocation of the carriage 39, and adjustment of the pick-up shoulders 167 and 171 controls the length of stroke.

In order to effect controlled forward reciprocation of the carriage 39, and of the torches, and rapid reverse, or backward movement thereof, the valve mechanism 135 is employed. This mechanism is interposed in the pipes 134, 136 forming the exhaust provision for the forward portion of the cylinder 51, as best shown in Figure 12, and comprises (Figures 20 and 21), a casing having one nipple 174 communicating with the pipe 134, and an opposite nipple 175, communicating with the pipe 136, the bores of nipples 174 and 175 being offset, and communicating with an intersecting chamber 176. In the chamber 176 there is mounted a reciprocatory plunger 177 having a beveled valve face 178, which controls communication of the bores of the nipples 174 and 175 with each other, the plunger 177 normally being urged through the medium of a coiled spring 179 in a direction to open communication between the nipples 174 and 175. The end of the plunger 177, exteriorly of the valve casing, carries a roller 180, which is engaged by a short arm 181 of a bell crank lever 182, the lever being pivoted adjacent its elbow, as at 183, upon a slide 184 adjustably supported for sliding movement in a support 185, the slide 184 being adjustable through the medium of a jack screw 186, which has a beveled gear 187 thereon, meshing with a beveled gear 188, mounted upon a shaft 189, the outer end of which carries a crank handle 190. Operation of the crank handle 190 effects raising or lowering of the slide 184 and changes the effective movement, of the short arm 181 of the lever and thus determines the position of the plunger 177. The long arm 191 of the lever 182 is disposed in line with a roller 192 carried by an extension on the yoke 48 which moves with the piston 50, and the roller 192 controls the position of the lever 182 as hereinafter explained.

As best shown in Figures 1, 2, 3, 24, 25, and 27, means are provided for presenting various types of work in position to be operated upon by the torches 89. These means preferably comprise a main work supporting means 193, including a hollow pedestal 194, provided at its bottom with laterally projecting flanges 195, slidably supported upon track members 196, and held in position by overlying plates 197, being thus mounted for sliding movements at right angles to the direction of movement of the torches 89. The track members 196 are supported upon channel beams 198, suitably secured in position and providing a hollow support into which extends a relatively long rack 199 fixed to the bottom of the pedestal 194, the rack 199 having meshed therewith a pinion 200, suitably carried by the channel beams, and rotation of which effects sliding travel of the pedestal 194. As best shown in Figures 1, 2, 3, 24, and 27, the upper end of the pedestal 194 carries a bifurcated head, between the furcations 201 of which is pivotally mounted a chuck support 202, upon one trunnion 203 of which is mounted a worm wheel 204, with which meshes a worm 205, operable by a crank 206, to tilt the chuck support 202 when desired, as shown in Figure 27. The chuck support 202 is in the form of a hollow cylinder 207, in the opposite ends of which are mounted ball bearing race members 208 for accommodating bearings 209 which cooperate with bearing races 210 secured to a shaft 211, the outer end of which carries the chuck proper, indicated at 212, the chuck having the usual type of radially adjustable jaws 213, adapted to be adjusted by rotation of the adjusting stem 214. Secured to an extension 215 of the trunnion 203, so as to rotate therewith, is an elongated support 216, having an adjustable connection 217 between its ends, and at its outer extremity provided with an angular arm 218 which carries a cylinder 219 in which is reciprocably mounted a rod 220. The rod 220 has a collar 221 thereon adjacent one end of the cylinder 219 and a coiled spring 222 surrounds the rod and is interposed between the collar 221 and the opposite end of the cylinder 219, the rod 220, exteriorly of the cylinder 219 having a conical head 223 adapted to extend between the teeth of a gear, while the opposite end of the rod 220 has an abutment 224. Pivotally attached to the abutment 224 is a link 225, having its opposite end pivotally attached to the mid-portion of a lever 226, one end portion of the lever 226 being pivotally secured to the forward portion of the cylinder, while the opposite end projects to form a handle portion 227 by means of which the lever may be operated, the construction providing in effect a toggle arrangement for retraction or projection of the conical head 223. The pedestal 194 is also provided at one side with a cradle 228, adapted in certain operations to cooperate with a similar cradle 229 carried by the side wall of the housing 32.

An auxiliary work holder 230 is also provided (Figures 3 and 24) and is stationarily mounted at one side of the housing 32, and longitudinally in line with the pedestal 194 when the latter is substantially at the extreme end of its transverse movement as shown in Figure 3. The work holder 230 comprises a pedestal rigidly secured to channel beams 231, and at its upper end carries a platform upon which is mounted a relatively long slide 232, held in position by plates 233. The under surface of the slide 232 is provided with a rack 234 with which meshes a pinion 235, manipulable by a crank 236, to advance or retract the slide 232. At its forward end the slide 232 carries a chuck support 237 having spaced bearing races 238, accommodating balls 239, cooperating with race bearings 240, fixed to a shaft 241, the forward end of which carries the chuck proper 242. The chuck itself may be of any suitable construction, having the usual radially adjustable jaws 243, adjustable through manipulation of a control stem 244.

The operation of the means which control movement of the reciprocating carriage 39, and of the torches 89 is as follows: assuming the control valve mechanism 109 to be in the full line position shown in Figures 12 and 15, and the control valve actuating mechanism to be in the position shown in Figure 18, the fluid from the pump 100 will enter the inlet duct 108, pass through the duct 112, through the groove 139 in the valve member 138, into the duct 114, duct 115, duct 116, through the pipe 117, pipe 118, the valve 120, pipe 119, to the rear end of the cylinder 51, and behind the piston 50, urging the piston 50 in a forward direction, passage of the fluid through the pipe 122 being checked by the one-way valve 123. As the piston 50 and the carriage 39 move forwardly, fluid previously introduced into the cylinder 51 in front of the piston 50 will be forced out of the cylinder, and the pipe 133 being blocked by the one-way valve 132 will travel through the pipe 134 to the retarding mechanism 135, through the latter, and the pipes 136 and 131 to the duct 130, and finding free passage through the groove 140 in the valve member 138, will pass through the duct 137, through the pipe 126 to the reservoir 103 via the pipe 111. In passing through the retarding mechanism 135 the fluid enters the nipple 174, passes into the chamber 176, thence past the beveled valve face 178, and into the nipple 175, passing thence through the pipe 136, the position of the beveled valve face 178 with reference to the entrance to the nipple 175, controlling the speed with which the liquid is exhausted from the forward portion of the cylinder 51. The position of the plunger 177 is controlled by the position of the short arm 181 of the bell crank lever 182 which engages the roller 180 carried by the plunger 177; if the slide 184 is elevated the short arm 181 of the lever 182 has a greater throw, and of course presses the plunger 177 inwardly not only at a greater speed, but a greater distance. Adjustment of the vertical position of the lever 182 is controlled by the crank handle 190, which is adapted to rotate the beveled gear 188, causing rotation of the jack screw 186, and reciprocation of the slide 184, as will be understood. To retard the speed of movement of the piston rod 49, the slide 184 may be adjusted so that the arm 191 inclines upwardly with respect to the horizontal, as shown in dotted lines in Figure 4. Then, as the yoke 48 moves forward with the piston rod 49, the roller 192 travels along the lever 182 and gradually depresses the same, to gradually move the plunger 177 to the left as viewed in Figure 20, and thus gradually reduce the opening through which the exhaust fluid must pass, and of course progressively slowing down the forward travel of the piston 50, and of the carriage 39. Of course, if desired, the lever mechanism 182 may be positioned, as shown in full lines in Figure 4, so that the reverse action just described may take place, that is, the plunger 177 may move in the reverse direction and gradually open the opening through which the exhaust fluid must pass, and hence progressively increase speed as the forward stroke continues. It will be appreciated that the arm 191 may be positioned so that it is not moved by traversing movement of the roller 192, whereby the particular setting of the valve 135 is not changed during movement of the yoke 48. Adjacent the end of the forward stroke of the carriage 39 the shoulder 167 thereon engages the shoulder 153 of the dog 145 and carries the dog forwardly against the action of the spring 152. The cam shoe 168 traveling in advance of the shoulder 167 engages the pin 164 to lift the dog 147 out of the notch 146, and synchronously the pin 156 of the dog 145 engaging the cam surface 169 cams the dog 145 into engagement with the notch 144, whereupon the dog 145 reverses the position of the oscillating member 143, and of the control valve member 138, so that the ducts 112 and 114 are closed, and the ducts 116 and 125 opened, to permit unimpeded exhaust from the rear of the piston 50 through the one-way valve 123, pipe 122, pipe 117, duct 116, groove 139, duct 125, and exhaust pipe 126. Simultaneous with this operation the ducts 127 and 128 are placed into communication with the groove 140 in the control valve 139, and communication through the ducts 130 and 137 is closed, whereupon fluid travels through the pipe 131, one-way valve 132, pipe 133, to the cylinder forwardly of the piston 50 to effect its rearward stroke and a rearward movement of the carriage 39, and since the exhaust from behind the piston 50 is unimpeded, the piston 50 and carriage 39 move much more rapidly than on the forward stroke. Near the limit of the rearward movement of the carriage 39 the shoulder 171 engages the shoulder 163 of the dog 147, carrying the dog outwardly against the pressure of the spring 162, while the cam 172 engages beneath the pin 154 of the dog 145 to lift the same out of the notch 144, and the pin 165 engaging the cam surface 173 cams the dog 147 into the notch 146, whereupon backward movement of the dog 147 under the influence of the spring 162 reverses the position of the oscillating member 143 and of the valve member 138, whereupon the initial position of the valve member 138 is restored. By this arrangement it is apparent that on the forward stroke of the reciprocating carriage, the speed may be increased, or decreased, progressively, through operation of the control valve mechanism 135, while the dogs 145 and 147, and exhaust mechanism, bring about the reverse movements of the carriage 39, it being pointed out that an important feature of the invention resides in obtaining a relatively slow forward stroke during which time the flame from the torch nozzle travels slowly over the surface to be treated, but at the end of such travel is quickly restored to initial position to eliminate any necessity for extinguishing the flame in treating successive parts of a piece of work.

In presenting the work to be operated upon, for example a beveled gear, as shown in Figure 27, the beveled gear is fixed upon a suitable stub shaft which is clamped within the jaws 213 of the chuck 212, and with the pedestal 194 moved to a position longitudinally in line with the movement of the carriage 39, and of the torches 89, the chuck support is tilted through manipulation of the crank 206, to present the teeth of the beveled gear to be hardened in a plane parallel to the plane of movement of the torches 89, the conical head 223 of the holder being engaged between the teeth of the gear to prevent accidental rotation. The nozzles 90 of the torches 89 are then placed one on each side of the tooth, adjustment of the nozzles vertically being permitted by manipulation of the set screw 79, and laterally by relative rotation between the discs 83 and the torch carrying discs 84. The guide arm 98 may be detached, and the guide means 95a may be attached so that the finger 95b is disposed to bear against the forwardly diverging surface of the beveled gear tooth, whereupon forward reciprocation of the carriage 39 causes the torches 89 to play a flame upon the selected tooth of the gear, the metal of the tooth being quenched by the following cooling fluid, the guide means 95a riding upon the diverging surface of the gear tooth treated, causing rotation of one disc 84, and through the spring 86 reverse rotation of the other disc 84, causing the nozzles 90 to spread and maintain proper distance from the surface treated throughout the forward movement, and when the carriage reaches the end of the tooth, through operation of the reversing mechanism heretofore described, the torches 89 are rapidly drawn rearwardly, and the spring 87 will restore the discs 83 and nozzles 90 to initial position, whereupon the beveled gear may be rotated to present the next tooth. In the case of treatment of a beveled gear, such as that referred to, the tooth is presented so that the same increases in cross-sectional thickness from front to back, and of course under these circumstances it is necessary to play the flame longer upon the thicker portions than upon the less thick portions; accordingly, the control means 135 are set, by moving the arm 191 of lever 182 to the position shown in dotted lines in Figure 4, so that the initial travel of the torches 89 is relatively fast but progressively decreases as the torches 89 reach the greater cross-sectional thickness of the tooth, the torches when reaching the end of the tooth being rapidly retracted by the carriage 39, as before explained. The pyrometer 97 is employed whenever desirable to visually indicate the degree of heat present during the operation.

In operating upon a spur gear, shown in Figure 24, for instance, the auxiliary holder 230 is employed in connection with the main work supporting means 193. In this application the work supporting means 193 are shifted transversely along the track members 196 by rotation of the pinion 200 engaging the rack 199 of the pedestal 194, and is shifted to such an extent as to lie longitudinally in line with the auxiliary holding means 230. The chuck support 202 is placed in a horizontal position through manipulation of the crank 206. The slide 232 of the auxiliary holding means is advanced by manipulation of the pinion 235 which engages the rack 234 attached to the slide 232. The jaws 213 of the chuck 212 and the jaws 243 of the chuck 242 are then adjusted so as to be inserted into the hub of the gear. Of course when the work supporting means 193 and the auxiliary holding means 230 are lined up in this manner they are at one side of the reciprocating carriage 39 and the torches 89. To bring the torches 89 to proper position (Figures 6, 7, 8, and 9) the stand 60 is swung over toward the work through manipulation of the worm 67 engaging the worm gear 63, and the slide 69 is moved along the stand 60 the desired distance until the torches 89 overlie the teeth of the work, after which additional adjustments may be made by shifting the supporting member 72, the discs 84, and the set screw 79, after which the operation as heretofore described can be carried out.

When working upon a relatively small helical gear, for example (Figures 25 and 26) the work supporting means 193 may be shifted in the manner heretofore described to bring the cradles 226 and 229 longitudinally in line, and the helical gear is mounted upon a relatively long shaft, the ends of which are supported in these cradles. In this case the stand 60 and torches 89 are adjusted as before to overlie the teeth of the gear, and the guide finger 98 is clamped in position and disposed between the teeth of the gear so that as the carriage moves in a rectilineal direction the helical gear will be rotated by the guide finger to present the tooth or rib of the gear along a rectilineal path as will be understood. In case a hypoid gear is treated both the guide means 98 and the guide means 95a are employed, the first to cause the curved hypoid tooth to be presented along a rectilineal path, by rotation of the gear, and the guide means 95a to cause spreading of the torches 89 and nozzles 90 as the gear tooth diverges rearwardly.

By reason of the wide latitude of adjustments, almost any type of gear may be operated upon, and it will be understood that other types of gears may readily be handled by employment of the means herein described.

A different embodiment of work holding means is disclosed in Figures 30 and 31. In this embodiment a shiftable pedestal 245 is provided, mounted to slide substantially in the same manner as the work supporting pedestal 194. At its upper end the pedestal has furcations 246 in which is mounted a shaft 247 carrying a drum 248, the shaft having a ratchet wheel 249 thereon with which engages a spring pressed tooth 250, the construction being such that as the crank 251 on the shaft 247 is rotated, the drum will be advanced one step at a time so as to present each successive piece of work in position to be operated upon by the torches 89. The work, which may be of any character it is desired to harden, may be secured in circumferentially spaced relation along the face of the drum, being indicated at 252, and held in position by any suitable clamping means indicated at 253. In operation the torches will be played along the work 252, then reversed, the drum 248 advanced in position, and so on, new pieces of work being secured on the drum, and the treated pieces removed in a continuous operation.

The method herein contemplated comprises advancing a flame with following quenching provisions over a piece of metal to be hardened, as by the reciprocation of the carriage 39 and torches 89 above referred to, and wherein the flame is reversed in its travel at a more rapid rate than its advance, as by the hydraulic provisions heretofore described in detail, and wherein the advance of the hardening flame and quenching provisions is controlled in accordance with the cross-sectional thickness of the work operated upon, as by the provision of control means best shown in Figure 20.

Additionally the method contemplates relative adjustment of the work holders and reciprocating torches to accommodate a wide variety of different types of work, all as heretofore described in detail.

It will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. Apparatus for heat treating the teeth of a bevel gear, comprising: a reciprocable carriage; heat treating means, supported by said carriage, and adapted to traverse a gear tooth during reciprocation of said carriage; means, supporting the gear, so constructed and arranged that a gear tooth is in alignment with the movement of said heat treating means; said heat treating means comprising a pair of torches constructed and arranged to move toward and away with respect to each other, each of said torches having a burner portion adapted to be positioned in desired spaced relation with a respective one of the opposite surfaces of the gear tooth; and means, including a finger portion directly and slidably engaging one of the opposite surfaces of the tooth being treated during reciprocation of said carriage, said means being so constructed and arranged to simultaneously move both torches toward or away from each other, depending upon the varying dimension between the tooth surfaces, so as to maintain said burner portions in desired spaced relation with respect to the respective tooth surfaces.

2. Apparatus for heat treating the teeth of a bevel gear, comprising: a reciprocable carriage; heat treating means, supported by said carriage, and adapted to traverse a gear tooth during reciprocation of said carriage; means, supporting the gear, so constructed and arranged that a gear tooth is in alignment with the movement of said heat treating means; said heat treating means comprising a pair of rotatably mounted disks, and torches respectively carried by said disks, each of said torches having a burner portion adapted to be positioned in desired spaced relation with a respective one of the opposite surfaces of the gear tooth; band means, connecting said disks, and so constructed and arranged that rotation of one disk in one direction causes corresponding rotation of the other disk in the opposite direction; means biasing said disks in certain opposite directions so that said burner portions are biased toward each other; and finger means, connected to one of said disks, so constructed and arranged that it is adapted to directly and slidably engage one of the opposite surfaces of the tooth being treated, and that movement of said carriage causes it to be moved transversely to its sliding engagement by reason of the varying thickness of the tooth to effect rotation of said one of said disks a proportionate amount and maintain said burner portions in desired spaced relation with respect to said tooth surfaces.

3. Heat treating apparatus, comprising: work supporting means; a carriage, reciprocable with respect to said work supporting means; guide means so constructed and arranged that it is swingable, about an axis in the general direction of reciprocation of said carriage; slide means, carried by said guide means, so constructed and arranged that it is slidable with respect to said guide means in a direction transverse to said axis; bracket means, carried by said slide means, constructed and arranged to swing about an axis disposed in the general direction of reciprocation of said carriage, said bracket means having a shaft the axis of which is transverse to the guide means axis; heat treating means, carried by said bracket means shaft and swingable about this shaft, said heat treating means being constructed and arranged to traverse the work carried by said work supporting means during reciprocation of said carriage; and means effecting adjustment of said heat treating means about said bracket shaft.

4. Heat treating apparatus, comprising: work supporting means; a carriage, reciprocable with respect to said work supporting means; a rotatable shaft, carried by said carriage, the axis of said shaft being generally parallel to the reciprocation of said carriage; guide means fixed to said shaft, and rotatable with said shaft; slide means, carried by said guide means, so constructed and arranged that it is slidable with respect to said guide means in a direction transverse to the axis of said shaft; bracket means, carried by said slide means, and having a shaft the axis of which is transverse to the axis of the shaft carried by said carriage; and heat treating means, swingable about said bracket means shaft, and including means for effecting adjustment of said heat treating means to a desired position about said bracket means shaft, said heat treating means being constructed and arranged to traverse the work carried by said work supporting means during reciprocation of said carriage.

5. Heat treating apparatus, comprising: work supporting means; a reciprocable carriage; actuating means, constructed and arranged to reciprocate said carriage; heat treating means, movable with said carriage, constructed and arranged to heat treat the work supported by said work supporting means; control means, connected to said actuating means, constructed and arranged to change said actuating means, so as to change the speed of movement of said carriage; lever means, having an operating connection with said control means, and having an arm movable transversely with respect to the line of movement of said carriage; traversing means, movable in unison with said carriage, constructed and arranged to traverse said arm; and means for positioning said arm either angularly or in parallelism with respect to the line of movement of said carriage, said arm when in angular position moving toward parallel position in response to traversing movement of said traversing means, thereby effecting movement of said control means and controlling the speed of movement of said carriage.

6. Heat treating apparatus, comprising: work supporting means; base means, a carriage mounted on said base means for reciprocatory movement; actuating means, constructed and arranged to reciprocate said carriage; heat treating means, movable with said carriage, constructed and arranged to heat treat the work supported by said work supporting means; control means, carried by said base means and connected to said actuating means, constructed and arranged to change the actuating force transmitted to said carriage, so as to change the speed of movement of said carriage; lever means, having an operating connection with said control means, and having an arm movable transversely with respect to the line of movement of said carriage; traversing means, movable in unison with said carriage, constructed and arranged to traverse said arm; means biasing said arm to engagement with said traversing means; slide means, providing the pivot for said lever means, and constructed and arranged to slide along ways carried by said base means, in a direction transverse to the movement of said carriage, the lever means pivot being offset with respect to the place of engagement of said traversing means with said arm, so that movement of said slide means causes said lever means to swing about its pivot and also about the point of engagement of said traversing means with said arm, so as to position said arm either angularly or in parallelism with respect to the line of movement of said carriage, said arm when in angular position moving toward parallel position in response to traversing movement of said traversing means, thereby effecting movement of said control means and controlling the speed of movement of said carriage.

7. Heat treating apparatus, comprising: work supporting means; base means; a carriage reciprocably mounted on said base means; hydraulic actuating means, constructed and arranged to reciprocate said carriage; heat treating means, movable with said carriage, constructed and arranged to heat treat the work supported by said work supporting means; valve means, connected to said actuating means, constructed and arranged to change the actuating force transmitted to said carriage, so as to change the speed of movement of said carriage, said valve means comprising an extensible-retractable operating rod spring-pressed to extended position; bell-crank lever means, having one arm engaging said operating rod and having its other arm movable transversely with respect to the line of movement of said carriage; traversing means, movable in unison with said carriage, constructed and arranged to traverse said other arm, the spring associated with said operating rod urging movement of said lever means in the direction wherein said other arm constantly bears against a portion of said traversing means; slide means providing the pivot for said bell-crank lever means, and constructed and arranged to slide along ways carried by said base means, in a direction transverse to the movement of said carriage, said pivot being offset with respect to the place of engagement of said traversing means with said other arm, so that movement of said slide means causes said lever means to swing about its pivot and also about the point of engagement of said traversing means with said other arm, so as to position said other arm either angularly or in parallelism with respect to the line of movement of said carriage, said other arm when in angular position moving toward parallel position in response to traversing movement of said traversing means, thereby effecting movement of said operating rod and controlling fluid flow through said valve means.

8. Heat treating apparatus, comprising: work supporting means; a reciprocable carriage; heat treating means, supported by said carriage, and adapted to traverse the work carried by said supporting means during movement of said carriage; actuating means for reciprocating said carriage, comprising control mechanism movable to different positions, in one position effecting movement of said carriage in one direction, and in another position effecting movement of said carriage in the opposite direction; spaced abutments carried by said carriage; first dog means for engaging and moving said control mechanism to one of said positions, and for releasably holding said control mechanism in said one position; second dog means for engaging and moving said control mechanism to the other of said positions, and for releasably holding said control mechanism in said other position; and means, including one or the other of said spaced abutments, constructed and arranged to cause engagement of one of said dog means with said control mechanism, and synchronously cause disengagement of the other dog means from said control mechanism.

9. Heat treating apparatus, comprising: work supporting means; a reciprocable carriage; heat treating means, supported by said carriage, and constructed and arranged to traverse the work carried by said supporting means during movement of said carriage; actuating means for reciprocating said carriage, comprising control mechanism movable to different positions, in one position effecting movement of said carriage in one direction, and in another position effecting movement of said carriage in the opposite direction; spaced abutments carried by said carriage; first dog means for engaging and moving said control mechanism to one of said positions, and for releasably holding said control mechanism in said one position; second dog means for engaging and moving said control mechanism to the other of said positions, and for releasably holding said control mechanism in said other position; means, including one or the other of said spaced abutments, constructed and arranged to cause engagement of one of said dog means with said control mechanism, and synchronously cause disengagement of the other dog means from said control mechanism; and resilient means, operating on respective dog means, constructed and arranged to store energy when one of said dog means is moved to engagement with said control mechanism, and to release the stored energy when the other of said dog means is disengaged from said control mechanism, so as to move said control mechanism from one position to another with a snap action.

10. Heat treating apparatus, comprising: work supporting means; base means; a carriage, supported by said base means for reciprocatory movement; heat treating means, supported by said carriage, and constructed and arranged to traverse the work carried by said supporting means during movement of said carriage; actuating means for reciprocating said carriage, comprising control mechanism movable to different positions, in one position effecting movement of said carriage in one direction, and in another position effecting movement of said carriage in the opposite direction; spaced abutments, each including cam means, carried by said carriage; spaced guide means carried by said base means; a first dog member, slidably carried by one of said guide means, and constructed and arranged to move to an extended or retracted position with respect to said one guide means; first biasing means, for biasing said first dog member to retracted position; a second dog member, slidably carried by the other of said guide means, and constructed and arranged to move to an extended or retracted position with respect to said other guide means; second biasing means, for biasing said second dog member to retracted position; said dog members and said biasing means being so constructed and arranged that one of said dog members engages and holds the control means in one position during movement of the carriage in one direction, and the other dog member engages and holds the control means in the other position during movement of the carriage in the other direction; spaced stationary cam means, carried by said base means, constructed and arranged to cooperate with respective dog members; and spaced abutments, each including cam means, carried by said carriage, said abutments being constructed and arranged to co-operate with respective dog members; one of said abutments, during movement of said carriage in one direction, being constructed and arranged to engage and move the respective dog member which is out of engagement with said control means to extended position, and the respective one of said stationary cam means being constructed and arranged to move said respective dog member to engagement with said control means, the cam means carried by said one abutment synchronously disengaging the other dog member from engagement with said control means, so that the biasing means operating on the said respective dog member urges this dog member to retracted position and also moves the control means to its respective position.

11. Heat treating apparatus, comprising: work supporting means; a carriage, reciprocable with respect to said work supporting means; swingable means, carried by said carriage, so constructed and arranged that it is swingable about an axis which is disposed in the general direction of reciprocation of said carriage, while being restrained against movement with respect to said carriage in the direction of said axis; movable means, carried by said swingable means, so constructed and arranged that it is movable with respect to said swingable means in a direction transverse to said axis; and heat treating means, carried by said movable means, constructed and arranged to traverse the work carried by said work supporting means during reciprocation of said carriage.

12. Heat treating apparatus, comprising: work supporting means; a carriage, reciprocable with respect to said work supporting means; swingable means, carried by said carriage, so constructed and arranged that it is swingable, about an axis which is disposed in the general direction of reciprocation of said carriage; movable means, carried by said swingable means, so constructed and arranged that it is movable with respect to said swingable means in a direction transverse to said axis; and heat treating means, carried by said movable means.

13. Heat treating apparatus, comprising: work supporting means; a carriage, reciprocable with respect to said work supporting means; swingable means, carried by said carriage, so constructed and arranged that it is swingable about an axis which is disposed in the general direction of reciprocation of said carriage; movable means, carried by said swingable means, so constructed and arranged that it is movable with respect to said swingable means in a direction transverse to said axis; at least one elongated member carried by said movable means and extending transversely to the direction of movement of said movable means; and heat treating means, carried by said elongated member, constructed and arranged to traverse the work carried by said work supporting means during reciprocation of said carriage.

14. Heat treating apparatus, comprising: base means; work supporting means; a carriage, mounted on said base means for reciprocable movement, and having an apertured portion; heat treating means, supported by said carriage, and constructed and arranged to traverse the work supported by said work supporting means during reciprocation of said carriage; hydraulic means, including a reciprocable piston rod; rod means, disposed generally parallel and generally co-extensive with respect to said piston rod, and movable in unison with said pison rod, said rod means being slidably received within the apertured portion of said carriage, so that said carriage may be moved relative to said rod means, toward and away from the work being treated; and manually operable clamp means, including a screw threaded through said carriage and constructed and arranged to clamp said rod means against movement with respect to said carriage.

15. Heat treating apparatus, for heat treating work having opposite surfaces which are symmetrical with respect to a plane intermediate said surfaces, said apparatus comprising; supporting means so constructed and arranged that said supporting means and the work are relatively movable; a pair of heat treating members, each cooperable with a respective one of said opposite surfaces; means mounting said members on said supporting means, so that said relative movement of said supporting means and the work causes traversing movement of said members, relatively to said surfaces and generally collateral with said intermediate plane, and also so mounting said members that said members are movable relatively to said supporting means, transversely of said plane, toward and away from each other, said members being constructed and arranged to respectively heat treat said opposite surfaces; and means, controlled by the contour of at least one of said surfaces during said traversing movement of said members, constructed and arranged to cause simultaneous movement of both of said members toward or away from each other, depending upon the contour of said one surface, so as to maintain said members and the respective surfaces in predetermined relation with respect to each other.

16. Apparatus for heat treating tapered gear teeth, comprising: supporting means so constructed and arranged that said supporting means and the gear are relatively movable; a pair of heat treating members, each cooperable with a respective one of the opposite surfaces of a tooth of the gear; means mounting said members on said supporting means, so that said relative movement of said supporting means and the gear causes said members to move lengthwise of the tooth, and also so mounting said members that said members are movable, relatively to said supporting means, toward and away from each other; and means, including a portion engaging at least one surface of the tooth during said lengthwise movement of said members, constructed and arranged to cause simultaneous movement of both of said members toward or away from each other, depending upon the varying dimension between the opposite surfaces of the tooth, so as to maintain said members and the respective tooth surfaces in predetermined relation with respect to each other.

17. Apparatus for heat treating tapered gear teeth, comprising: supporting means so constructed and arranged that said supporting means and the gear are relatively movable; a pair of heat treating members, for heat treating opposite surfaces of a tooth of the gear; means mounting said members on said supporting means, so that said relative movement of said supporting means and the gear causes each of said members to move lengthwise of a respective one of the opposite surfaces of the tooth, and also so mounting said members that said members are movable, relatively to said supporting means, toward and away from each other; motive means for moving said supporting means; means for controlling said motive means to cause said lengthwise movement to be relatively slow in one direction and relatively rapid in the reverse direction; and means, including a portion engaging at least one surface of the tooth during said lengthwise movement of said members, constructed and arranged to cause simultaneous movement of both of said members toward or away from each other, depending upon the varying dimension between the opposite surfaces of the tooth, so as to maintain said members and the respective tooth surfaces in predetermined relation with respect to each other.

18. Heat treating apparatus, comprising: a reciprocable carriage; heat treating means, supported by said carriage; first supporting means, disposed alongside of said reciprocable carriage; first chuck means mounted on said first supporting means and adapted individually to hold work in position to be traversed by said heat treating means during reciprocation of said carriage; second supporting means, spaced from said first supporting means; second chuck means mounted on said second supporting means and adapted individually to hold work in position to be traversed by said heat treating means during reciprocation of said carriage; stationary base means for supporting said second work supporting means; said second supporting means and said base means being relatively so constructed and arranged that said second supporting means is bodily movable in but one general plane, in a direction transversely of the direction of reciprocation of said carriage so that said second chuck means may be brought to selected positions including positions in which said second chuck means is generally alined with said carriage or with said first chuck means; and said first and second chuck means being so constructed and arranged that when they are in said general alinement they are adapted to be adjusted so as to jointly support work.

19. Heat treating apparatus, comprising: first base means; first carriage means reciprocably slidable on said first base means; heat treating means, supported on said first carriage means, and reciprocable with said first carriage means; second base means positioned alongside of said first base means; second carriage means reciprocably slidable on said second base means in a path extending in the general direction of the path of reciprocation of said first carriage means, said second carriage means comprising first means for individually supporting work to be heat treated by said heat treating means; third base means, spaced from said second base means and extending transversely of the general direction of reciprocation of said first and second carriage means; third carriage means comprising second means for individually supporting work to be heat treated by said heat treating means; said third carriage means being so constructed and arranged that it is reciprocably slidable on said third base means transversely to the general direction of reciprocation of said first and second carriage means, so that said third carriage means may be brought to selected positions including positions in which said second work supporting means is in general alinement with said first carriage means or with said second carriage means; and said first and second work supporting means being so constructed and arranged that when they are in said alinement they are adapted to be adjusted so as to jointly support work.

20. Heat treating apparatus, comprising: a carriage mounted for reciprocatory movement; heat treating means, supported by said carriage, and reciprocable with said carriage; open sided bearing means, the open side of said bearing means being directed upwardly, and said bearing means being so mounted that the axis of said bearing means is disposed in the general direction of reciprocation of said carriage; second open sided bearing means, the open side of said second bearing means being directed upwardly; supporting means so supporting said second bearing means that the axis of said second bearing means is disposed in the general direction of reciprocation of said carriage; and said supporting means being so constructed and arranged that it is movable in a direction transverse to the direction of reciprocation of said carriage so that said second bearing means may be brought to selected positions including a position in which the axis of said second bearing means is substantially alined with the axis of said first bearing means, and so that a shaft carrying work may be laid into said open sided bearings, so that said work may be traversed by said heat treating means during reciprocation of said carriage.

CLAUDE W. DERHAMMER.